United States Patent
Yanagisawa et al.

(10) Patent No.: US 9,644,746 B2
(45) Date of Patent: May 9, 2017

(54) MECHANICAL SEAL

(71) Applicants: Eagle Industry Co., Ltd., Tokyo (JP); EagleBurgmann Japan Co., Ltd., Tokyo (JP)

(72) Inventors: Takashi Yanagisawa, Tokyo (JP); Takanori Sato, Tokyo (JP)

(73) Assignees: Eagle Industry Co., Ltd., Tokyo (JP); EagleBurgmann Japan Co., Ltd., Tokyo (JP)

( * ) Notice: Subject to any disclaimer, the term of this patent is extended or adjusted under 35 U.S.C. 154(b) by 0 days.

(21) Appl. No.: 14/407,206

(22) PCT Filed: Sep. 6, 2013

(86) PCT No.: PCT/JP2013/074046
§ 371 (c)(1),
(2) Date: Dec. 11, 2014

(87) PCT Pub. No.: WO2014/042085
PCT Pub. Date: Mar. 20, 2014

(65) Prior Publication Data
US 2015/0184753 A1 Jul. 2, 2015

(30) Foreign Application Priority Data
Sep. 11, 2012 (JP) .................. 2012-199500

(51) Int. Cl.
*F16J 15/34* (2006.01)
(52) U.S. Cl.
CPC ......... *F16J 15/3464* (2013.01); *F16J 15/348* (2013.01); *F16J 15/3468* (2013.01); *F16J 15/3472* (2013.01)
(58) Field of Classification Search
CPC ..... F16J 15/3464; F16J 15/348; F16J 15/3472
(Continued)

(56) References Cited

U.S. PATENT DOCUMENTS 4,256,313 A 3/1981 Arnold
5,275,421 A * 1/1994 Hornsby ................. 277/370
(Continued)

FOREIGN PATENT DOCUMENTS

CN 1409034 A 4/2003
CN 1662761 A 8/2005
(Continued)

OTHER PUBLICATIONS

Written Opinion of the International Searching Authority for PCT/JP2013/074046 with English Translation, mailed Oct. 29, 2013; ISA/JP.
(Continued)

*Primary Examiner* — Nicholas L Foster
(74) *Attorney, Agent, or Firm* — Harness, Dickey & Pierce, P.L.C.

(57) ABSTRACT

A mechanical seal having a seal cover that has a high versatility and is less prone to deformation even when secured to a housing by two bolts is provided. A mechanical seal 100 includes a rotating ring 40, a stationary ring 20, and a seal cover 10 to attach the stationary ring 20 to a housing 300. The seal cover 10 includes two U-shaped grooves 11 and two elongate holes 12 for bolting, which are disposed alternately and at regular intervals in a circumferential direction of the shaft hole, and elongate holes 12 are elongate in a radial direction of the shaft hole and innermost positions within the elongate holes 12 where bolt shanks can pass through are located further inward than innermost positions within the U-shaped grooves 11 where bolt shanks can pass through.

5 Claims, 4 Drawing Sheets

(58) Field of Classification Search
USPC .......................................................... 277/370
See application file for complete search history.

(56) References Cited

U.S. PATENT DOCUMENTS

| | | | | |
|---|---|---|---|---|
| 5,505,465 | A * | 4/1996 | Hornsby ........................ | 277/374 |
| 5,577,738 | A * | 11/1996 | Fukuda .......................... | 277/370 |
| 6,003,875 | A * | 12/1999 | Ellis et al. .................... | 277/370 |
| 6,231,048 | B1 | 5/2001 | McAnally, Jr. | |
| 6,460,858 | B1 | 10/2002 | Kitajima et al. | |
| 6,935,632 | B2 * | 8/2005 | Azibert et al. ................ | 277/370 |
| 7,029,012 | B2 * | 4/2006 | Roddis ........................... | 277/370 |
| 7,396,017 | B2 * | 7/2008 | Orlowski et al. ............. | 277/412 |
| 8,834,101 | B2 * | 9/2014 | Monnot ......................... | 415/126 |
| 2003/0042683 | A1 | 3/2003 | Takahashi | |
| 2003/0085526 | A1 * | 5/2003 | Kim ...................... F16J 15/002 | |
| | | | | 277/390 |
| 2006/0097455 | A1 | 5/2006 | Roddis | |
| 2009/0085300 | A1 * | 4/2009 | Takahashi ............ F16J 15/3404 | |
| | | | | 277/391 |
| 2012/0139186 | A1 * | 6/2012 | Suefuji .................... F16J 15/36 | |
| | | | | 277/377 |
| 2014/0035234 | A1 * | 2/2014 | Takahashi ............ F16J 15/3452 | |
| | | | | 277/379 |

FOREIGN PATENT DOCUMENTS

| | | |
|---|---|---|
| JP | 2002-005300 A | 1/2002 |
| JP | 2003-074713 A | 3/2003 |
| WO | 2004/001258 A1 | 12/2003 |

OTHER PUBLICATIONS

Extended European Search Report dated Aug. 26, 2015.
Chinese Office Action dated Jul. 15, 2015.

* cited by examiner

MECHANICAL SEAL

CROSS-REFERENCE TO RELATED APPLICATIONS

This application is a National Stage of International Application No. PCT/JP2013/074046, filed Sep. 6, 2013, which claims priority to Japanese Application No. 2012-199500, filed Sep. 11, 2012. The entire disclosures of each of the above applications are incorporated herein by reference.

FIELD

The present disclosure relates to a mechanical seal to seal an annular gap between a housing and a rotating shaft.

BACKGROUND

In mechanical seals used for pumps in general industrial applications (general purpose pumps), a sealing surface is formed between a stationary ring provided on a seal cover that is fixed to a housing of a pump body (stuffing box) and a rotating ring provided on a collar that is fixed to a rotating shaft. The seal cover is typically secured to an end face of the housing by bolts with a gasket in between. A housing end face generally has two or four fastening points (bolt holes or stud bolts) disposed at regular intervals in a circumferential direction of a shaft hole but fastening positions of these fastening points (radial positions in relation to the center of the shaft hole) may differ from one pump to another even if the diameter of rotating shafts are same. Thus, for conventional mechanical seals, seal covers having four U-shaped grooves disposed at regular intervals in a circumferential direction have been used in order to give them a versatility to be used in various pumps with different fastening positions (See Patent Document 1).

A seal cover of a mechanical seal according to prior art will be described below with reference to FIG. 4. FIG. 4 is a front view of a conventional mechanical seal. The seal cover 90 included in the mechanical seal 900 has four U-shaped grooves 91 that are disposed at regular intervals in a circumferential direction around the shaft hole. The U-shaped grooves 91 are extended as radially inward as possible so as to widen a range where bolt shanks can be passed through. Because the seal cover 90 is configured in such a way, it can be secured to either of pumps having two fastening points or four fastening points on their housing end faces, and a range of securable fastening positions becomes wider. Hence, its versatility is high.

However, when the seal cover 90 is secured at two U-shaped grooves 91 located at symmetrical positions about the center of the shaft hole, a deformation may be caused because of the fastening forces of the bolts. This causes a gasket to be compressed insufficiently and eventually lowers a sealing performance. Such deformation is particularly significant in the vicinity of the other two U-shaped grooves 91 where no bolts are fastened. The deformation is also particularly significant when the seal cover with a large shaft hole is secured. A thickness (a thickness in an axial direction) of the seal cover 90 may be increased in order to give a sufficient strength but other problems such as a weight increase or a spatial restriction at installation sites may arise.

CITATION LIST

Patent Literature

Patent Document 1: Japanese Patent Application Laid-open No. 2003-74713

SUMMARY

Technical Problem

An object of the present disclosure is to provide a mechanical seal having a seal cover that has a high versatility and is less prone to deformation even when secured to a housing by two bolts.

Solution to Problem

The present disclosure adopts the following means to achieve the object noted above.

According to the present disclosure, there is provided a mechanical seal to seal an annular gap between a rotating shaft and a housing, the mechanical seal comprising: a rotating ring rotating with the rotating shaft; a stationary ring being in sliding contact with the rotating ring; and a seal cover to attach the stationary ring to the housing, the seal cover having a shaft hole for the rotating shaft to pass through, characterized in that the seal cover comprises two grooves and two elongate holes for bolting, the grooves and the elongate holes being disposed alternately and at regular intervals in a circumferential direction of the shaft hole, and the elongate holes are elongate in a radial direction of the shaft hole and innermost positions within the elongate holes where bolt shanks can pass through are located further inward than innermost positions within the grooves where bolt shanks can pass through.

According to the present disclosure, the seal cover comprises two grooves and two elongate holes for bolting, which are disposed alternately and at regular intervals in a circumferential direction of the shaft hole. The elongate holes are elongate in the radial direction of the shaft hole and innermost positions within the elongate holes where bolt shanks can pass through are located further inward than innermost positions within the grooves where bolt shanks can pass through. Accordingly, the mechanical seal can be secured to either of pumps with two fastening points or four fastening points on their housing end faces. In case there are two fastening points and they are located radially outward, the seal cover can be secured by using the two grooves. On the other hand, in case there are two fastening points and they are located radially inward, the seal cover can be secured by using the two elongate holes. Namely, in case there are two fastening points, whether they are located radially outward or radially inward, the seal cover can be fastened. Accordingly, as a range of securable fastening positions to secure the mechanical seal can be as wide as that of the conventional mechanical seals, the versatility of the mechanical seal can become high.

In addition, according to the present disclosure, because the mechanical seal comprises two elongate holes, there are only two openings on the outer circumferential periphery of the seal cover, the strength on the outer circumferential side of the seal cover can be higher as compared to the conventional seal covers. Therefore, even when the seal cover is secured by passing bolt shanks through the two grooves, a deformation in the vicinity of the elongate holes that are not fastened by bolts can be effectively reduced. Moreover, according to the present disclosure, due to the above described configuration, the inner ends of the grooves are located radially more outward than the inner ends of the elongate holes. Thus the portions of the seal cover that are radially more inward than the inner ends of the grooves can be wide in the radial direction, hence the strength on the inner circumferential side of the seal cover can be higher as compared to the conventional seal covers. Therefore, even when the seal cover is secured by passing bolt shanks through the two elongate holes, a deformation in the vicinity of the grooves that are not fastened by bolts can be effectively reduced. As described, according to the mechanical seal of the present disclosure, even when it is secured with two bolts, a deformation of the seal cover can be suppressed and hence a resultant decrease in the sealing performance can be prevented.

Furthermore, according to the present disclosure, the seal cover may further comprise an annular protrusion provided on an inward side of inner ends of the elongate holes. By applying such a configuration, the strength of the seal cover can be increased by increasing the thickness of only the inner circumferential side of the seal cover, and thus problems such as a weight increase can be avoided.

Advantageous Effects of the Disclosure

According to the present disclosure, a mechanical seal having a seal cover that has a high versatility and is less prone to deformation even when secured to a housing by two bolts can be provided.

DRAWINGS

DETAILED DESCRIPTION

Modes for carrying out this disclosure will be hereinafter illustratively described in detail based on specific examples with reference to the drawings. It should be noted that, unless otherwise particularly specified, the sizes, materials, shapes, relative arrangement or the like of constituent components described in these examples are not intended to limit the scope of this disclosure.

Example 1

Figure 1:
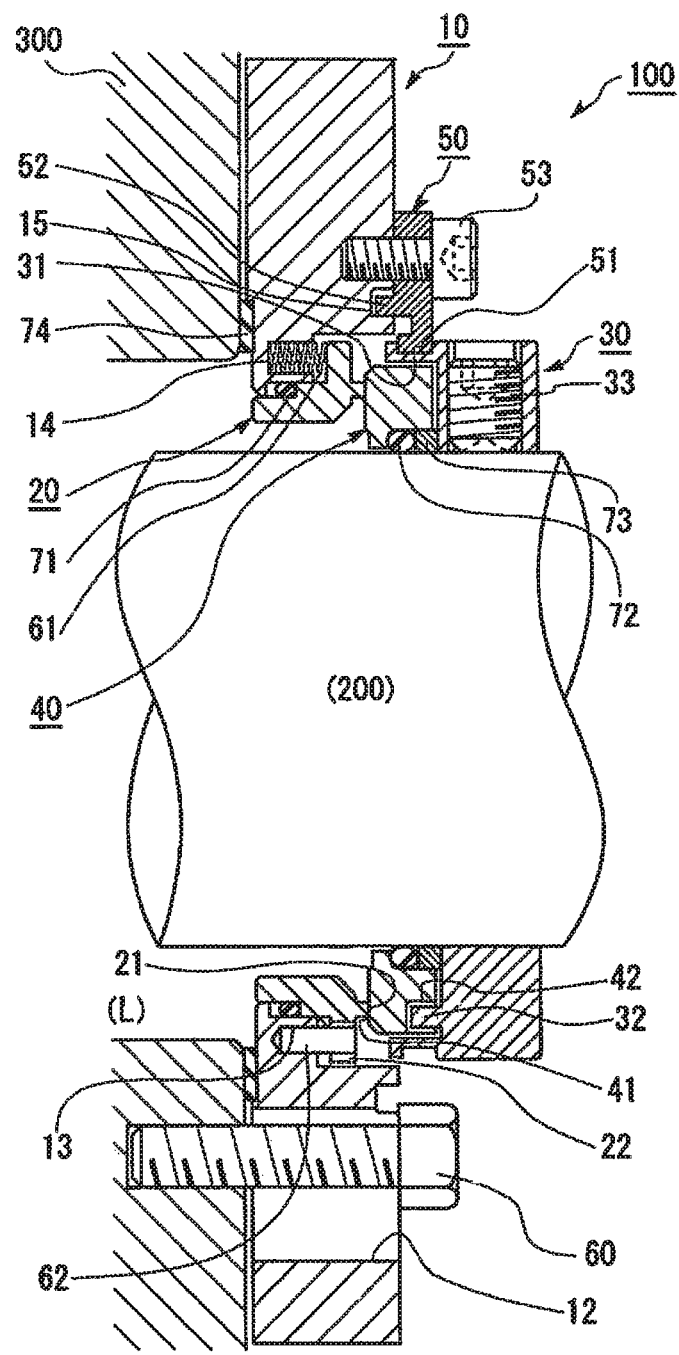
FIG. 1 is a schematic cross-sectional view illustrating a mechanical seal according to Example 1 of the present disclosure assembled with a rotating shaft and a housing.
Figure 2:
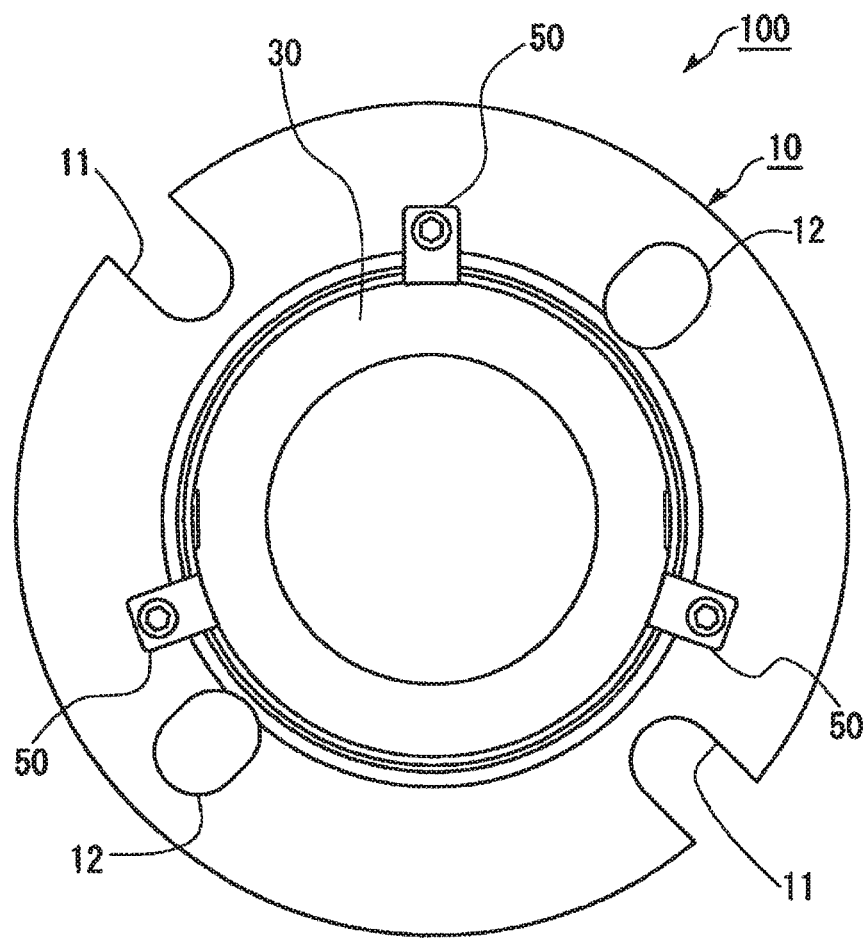
FIG. 2 is a front view of the mechanical seal according to Example 1 of the present disclosure.

The mechanical seal according to Example 1 of the present disclosure will be described with reference to FIG. 1 and FIG. 2. In this example, a mechanical seal generally known as a cartridge-type mechanical seal which has set plates that temporarily fix a seal cover and a collar of a rotating shaft to simplify an assembling process is exemplified <Overall Structure of Mechanical Seal>

The overall structure of the mechanical seal according to Example 1 of the present disclosure will be described with reference to FIG. 1 in particular. FIG. 1 is a schematic cross-sectional view illustrating a mechanical seal according to this example assembled with a rotating shaft and a housing. FIG. 1 is a cross-sectional view of the mechanical seal including the central axes of each annular component constituting the mechanical seal (the central axes coincide with the center axis of the rotating shaft). For the purpose of illustration, however, phases of the intersecting positions are arbitrarily changed in order to show the characteristic features. In addition, depth is basically omitted and only the end faces are shown in FIG. 1.

A mechanical seal 100 is provided to seal an annular gap between a rotating shaft 200 and a housing 300. A region (L) shown in FIG. 1 is a region where a liquid, which is a sealing object, is sealed in. The mechanical seal 100 includes a collar 30 fixed to the rotating shaft 200 and a rotating ring 40 retained by the collar 30 to rotate with the rotating shaft 200, and a stationary ring 20 being in sliding contact with the rotating ring 40. The mechanical seal 100 further has a shaft hole for the rotating shaft 200 to pass through, and a seal cover 10 for attaching the stationary ring 20 to the housing 300. The seal cover 10 includes two U-shaped grooves 11 and two elongate holes 12 for bolting which are disposed alternately and at regular intervals in a circumferential direction of the shaft hole (see FIG. 2). In the state shown in FIG. 1, the seal cover 10 is secured to an end face of the housing 300 by bolts 60 passing through the elongate holes 12. A gasket 74 made of a resin material such as PTFE is interposed between the end face of the housing 300 and the seal cover 10 to seal the gap between them.

The stationary ring 20 is made of a ceramic material such as SiC or alumina. The stationary ring 20 is configured such that its movement in a rotating direction relative to the seal cover 10 is restricted while its movement in an axial direction is allowed to some extent. Namely, a knock pin 62 is inserted in a pin hole 13 provided on the seal cover 10. And the knock pin 62 is fitted in a groove 22 formed on the stationary ring 20, so as to prevent the stationary ring 20 from rotating while allowing it to move in the axial direction relative to the seal cover 10. An O-ring 71 made of rubber is provided between an inner circumferential surface of the seal cover 10 and an outer circumferential surface of the stationary ring 20 to seal an annular gap between them. A spring 61, which is provided as a biasing member to press the stationary ring 20, is set in a spring hole 14 formed on the seal cover 10.

The mechanical seal 100 further has the annular collar 30 fixed to the rotating shaft 200 and the rotating ring 40 retained by the collar 30 to rotate with the rotating shaft 200. The collar 30 is made of a material such as stainless steel and configured to be directly secured to the rotating shaft 200 by a set screw 33. The rotating ring 40 is made of a ceramic material such as SiC or alumina. The rotating ring 40 is configured such that its movement in a rotating direction relative to the collar 30 is restricted while its movement in an axial direction is allowed to some extent. Namely, a protrusion 32 formed integrally on the collar 30 is fitted in a recess 42 formed on the rotating ring 40, so as to prevent the rotating ring 40 from rotating while allowing it to move in the axial direction relative to the collar 30. Accordingly, the rotating ring 40 rotates together with the collar 30 as the rotating shaft 200 rotates. An O-ring 72 made of rubber and a seal ring 73 made of stainless steel are provided between an inner circumferential surface of the rotating ring 40 and an outer circumferential surface of the rotating shaft 200 to seal an annular gap between them.

When the rotating ring 40 rotates with the rotating shaft 200, an end face of the stationary ring 20 and an end face of the rotating ring 40 slide against each other. Since the stationary ring 20 is biased toward the rotating ring 40 by the spring 61 provided as a biasing member as mentioned above, the sliding state between the stationary ring 20 and the rotating ring 40 is remained. Meanwhile, the stationary ring 20 is configured such that a distal end face 21 formed on an annular protrusion protruding toward the rotating ring 40 slides against an end face 41 on the stationary ring 20 side of the rotating ring 40.

The mechanical seal 100 according to this example is configured as a cartridge so that it can be handled as one component before being mounted to a predetermined position. Namely, the seal cover 10 and the collar 30 are temporarily set in position by means of set plates 50 fastened by bolts 53. More specifically, each set plate 50 is fastened to the seal cover 10, with one end 51 being fitted in a recess 31 formed on the collar 30 and a protruding portion 52 being abutted on an annular groove 15 formed on an end face on the collar side of the seal cover 10. In this example, the set plates 50 are provided at three locations in the circumferential direction (see FIG. 2). FIG. 1 shows the mechanical seal 100 that is remained as a cartridge. After the mechanical seal 100 has been mounted, the bolts 53 are unfastened to remove the set plates 50. Accordingly, the collar 30 and the rotating ring 40 are allowed to rotate with the rotating shaft 200, while the seal cover 10 and the stationary ring 20 are set in position relative to the housing 300.

<Seal Cover>

Next, the seal cover 10 will be described in more detail with reference to FIG. 2 in particular. FIG. 2 is a front view of the mechanical seal 100 viewed from the collar 30 side. The seal cover 10 includes two U-shaped grooves 11 and two elongate holes 12 which are disposed alternately and at regular intervals in the circumferential direction of the shaft hole. The elongate holes 12 are elongate in a radial direction of the shaft hole and innermost positions within the elongate holes 12 where bolt shanks can pass through are located further inward than innermost positions within the U-shaped grooves 11 where bolt shanks can pass through. In such a configuration, because there are only two openings on the outer circumferential periphery of the seal cover 10, the strength on the outer circumferential side can be higher as compared to the conventional seal covers. Moreover, because the inner ends of the U-shaped grooves 11 are located radially more outward than the inner ends of the elongate holes 12, the portions of the seal cover 10 that are radially more inward than the inner ends of the U-shaped grooves 11 are wide in the radial direction. Hence, the strength on the inner circumferential side can be higher as compared to the conventional seal covers. Meanwhile, the U-shaped grooves 11 and elongate holes 12 may be formed by a machining process such as cutting, or by molding if the seal cover 10 is produced by precision casting.

When securing the seal cover 10 onto the end face of the housing 300 with the gasket 74 in between, the following procedure may be taken. In case four fastening points are provided on the end face of the housing 300, the seal cover 10 can be fastened by passing bolts through both of the U-shaped grooves 11 and both of the elongate holes 12. In case only two fastening points are provided on the end face of the housing 300 and they are located radially inward, after the positions of the two elongate holes 12 are matched with the fastening points, the seal cover 10 can be fastened by bolts. On the other hand, in case only two fastening points are provided on the end face of the housing 300 and they are located radially outward, after the positions of the two U-shaped grooves 11 are matched with the fastening points, the seal cover 10 can be fastened by bolts. In case the two fastening points are on the locations where the seal cover 10 can be fastened at either of the U-shaped grooves 11 or the elongate holes 12, either of the two U-shaped grooves 11 or the two elongate holes 12 can be used.

<Advantages of the Mechanical Seal According to this Example>

According to the mechanical seal 100 of the present example, the seal cover 10 comprises two U-shaped grooves 11 and two elongate holes 12 for bolting, which are disposed alternately and at regular intervals in the circumferential direction of the shaft hole. The elongate holes 12 are elongate in the radial direction of the shaft hole and the innermost positions within the elongate holes 12 where bolt shanks can pass through are located further inward than the innermost positions within the U-shaped grooves 11 where bolt shanks can pass through. The mechanical seal 100 can therefore be secured to either of pumps with two fastening points or four fastening points on their housing end faces. In case there are two fastening points and they are located radially outward, the seal cover 10 can be secured by using the two U-shaped grooves 11. On the other hand, in case there are two fastening points and they are located radially inward, the seal cover 10 can be secured by using the two elongate holes 12. Namely, in case there are two fastening points, whether they are located radially outward or radially inward, the seal cover 10 can be fastened. Accordingly, as a range of securable fastening positions to secure the mechanical seal 100 can be as wide as that of conventional mechanical seals, the versatility of the mechanical seal 100 can become high.

In addition, according to the mechanical seal 100 of the present example, because the mechanical seal 100 comprises two elongate holes 12, there are only two openings on the outer circumferential periphery of the seal cover 10, and thus the strength on the outer circumferential side can be higher as compared to the conventional seal covers. Therefore, even when the seal cover 10 is secured by passing bolt shanks through the two U-shaped grooves 11, a deformation in the vicinity of the elongate holes 12 that are not fastened by bolts can be effectively reduced. Moreover, according to the mechanical seal 100, the inner ends of the U-shaped grooves 11 are located radially more outward than the inner ends of the elongate holes 12. Thus the inward side of the inner ends of the U-shaped grooves 11 can be wide in the radial direction, hence the strength on the inner circumferential side can be higher as compared to the conventional seal covers. Therefore, even when the seal cover 10 is secured by passing bolt shanks through the two elongate holes 12, a deformation in the vicinity of the U-shaped grooves 11 that are not fastened by bolts can be effectively reduced. As described, according to the mechanical seal 100 of the present example, even when it is secured with two bolts, a deformation of the seal cover can be suppressed and hence a resultant decrease in the sealing performance can be prevented. Accordingly, for example, even at an installation site where it is difficult to fasten the mechanical seal 100 with four bolts, by securing the mechanical seal 100 with two bolts, it becomes possible to seal the annular gap between the rotating shaft 200 and the housing 300 without degrading the sealing performance. In addition, according to the mechanical seal 100, even when the shaft hole has a large diameter, it can be secured with two bolts without degrading its sealing performance.

Example 2

Figure 3:
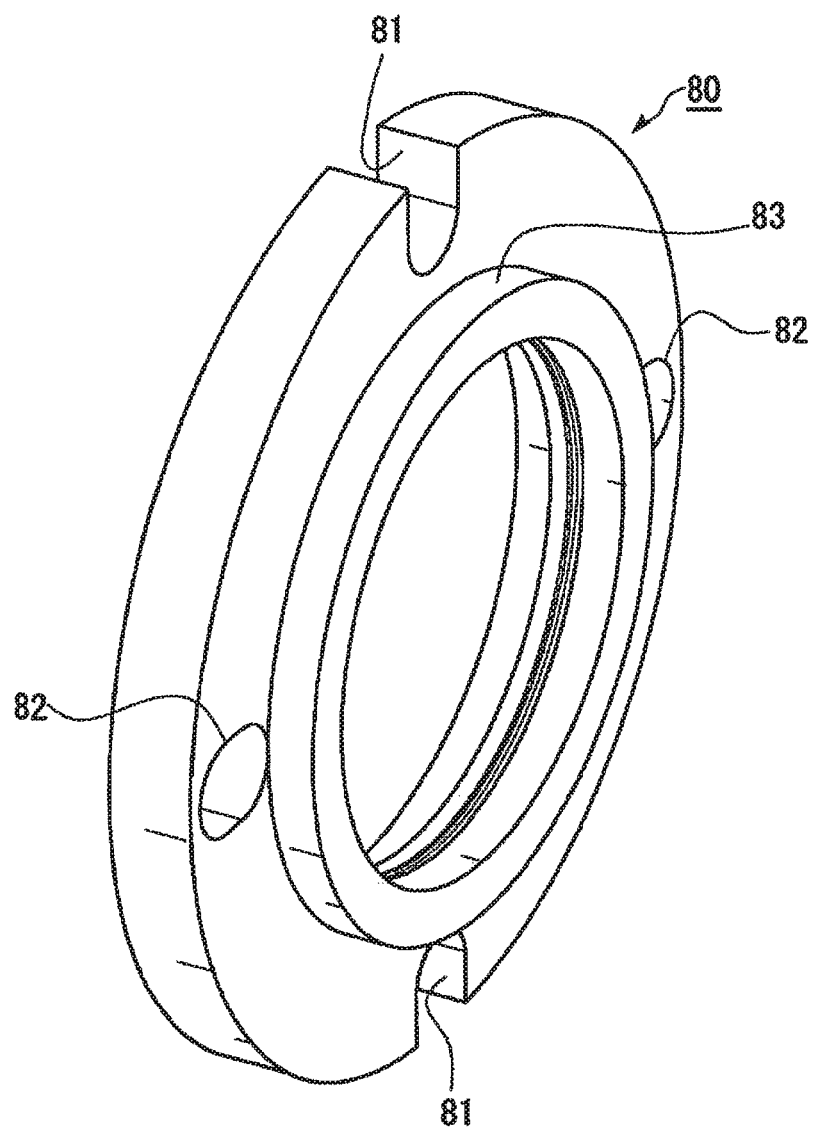
FIG. 3 is a perspective view of a seal cover of a mechanical seal according to Example 2 of the present disclosure.
Figure 4:
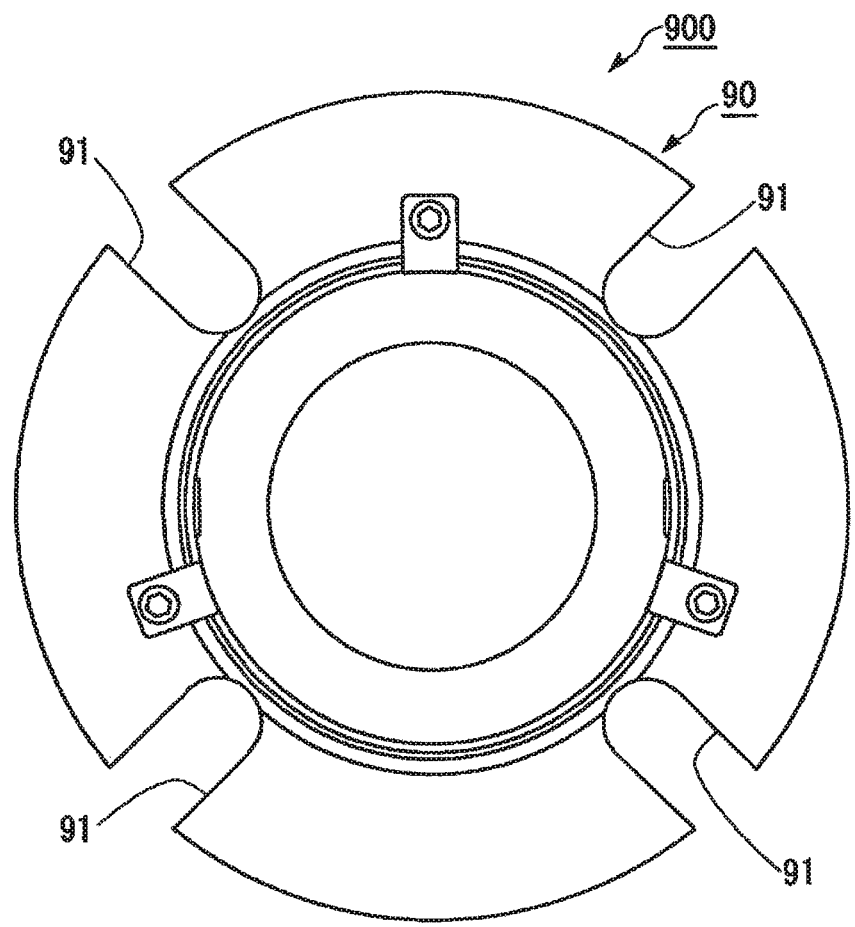
FIG. 4 is a front view of a conventional mechanical seal.

FIG. 3 shows a seal cover of a mechanical seal according to Example 2 of the present disclosure. FIG. 3 is a perspective view of the seal cover according to Example 2 viewed from the collar side when assembled. As shown in FIG. 3, the seal cover 80 includes two U-shaped grooves 81 and two elongate holes 82 for bolt fastening, which are disposed alternately and at regular intervals in a circumferential direction of a shaft hole. The elongate holes 82 are elongate in the radial direction of the shaft hole and innermost positions within the elongate holes 82 where bolt shanks can pass through are located further inward than innermost positions within the U-shaped grooves 81 where bolt shanks can pass through. The effects achieved by the seal cover 80 thus configured are the same as those achieved by the seal cover 10 of Example 1, hence their description is omitted. In addition, the seal cover 80 includes an annular protrusion 83 provided on an inward side of the inner ends of the elongate holes 82. By applying such a configuration, the strength of the seal cover 80 can be increased by increasing the thickness of only the inner circumferential side without increasing the entire thickness, hence problems such as a weight increase can be avoided.

REFERENCE SIGNS LIST

- 10, 80: seal cover
- 11, 81: U-shaped groove
- 12, 82: elongate hole
- 20: stationary ring
- 30: collar
- 40: rotating ring
- 100: mechanical seal
- 200: rotating shaft
- 300: housing

The invention claimed is:

1. A mechanical seal to seal an annular gap between a rotating shaft and a housing, the mechanical seal comprising:
    a rotating ring rotating with the rotating shaft;
    a stationary ring being in sliding contact with the rotating ring;
    a seal cover to attach the stationary ring to the housing, the seal cover having a shaft hole for the rotating shaft to pass through,
    a collar fixed to the rotating shaft; and
    a set plate by which the seal cover and the collar are set in position in a radial direction of the shaft,
    wherein an annular groove is formed in an end face on a collar side of the seal cover and opens in an axial direction of the shaft hole, a protruding portion is formed on the set plate, the seal cover is set in position in the radial direction of the shaft with the protruding portion of the set plate being abutted on the annular groove of the seal cover,
    wherein the seal cover comprises grooves receiving bolts and elongate holes receiving bolts for bolting the seal cover to the housing, and wherein there are only two of the grooves receiving the bolts and only two of the elongate holes receiving the bolts for bolting the seal cover to the housing, the grooves receiving the bolts and the elongate holes receiving the bolts being disposed alternately and at regular intervals in a circumferential direction of the shaft hole and the elongate holes receiving the bolts penetrate the seal cover and have a larger dimension in a radial direction of the shaft hole than in the circumferential direction of the shaft hole,
    wherein the elongate holes receiving the bolts are elongate in the radial direction of the shaft hole, and innermost positions of the elongate holes receiving the bolts where bolt shanks can pass through are located further inward than innermost positions of the grooves receiving the bolts where bolt shanks can pass through and the innermost positions of the elongate holes are located further inward than a wall of an outer circumferential side of the annular groove of the seal cover.

2. The mechanical seal according to claim 1, wherein the seal cover further comprises an annular protrusion provided on an inward side of inner ends of the elongate holes.

3. The mechanical seal according to claim 1, wherein a recess is formed on the collar in which one end of the set plate is fitted.

4. The mechanical seal according to claim 1, wherein the grooves receiving bolts and the elongate holes are substantially offset such that they allow extra internal strength at the grooves receiving bolts and extra external strength at the elongate holes.

5. The mechanical seal according to claim 1, wherein a wall of the elongate hole and the wall of the outer circumferential side of the annular groove of the seal cover constitute a continuous surface.

* * * * *